US008479219B2

(12) United States Patent
Gopalakrishna et al.

(10) Patent No.: US 8,479,219 B2
(45) Date of Patent: Jul. 2, 2013

(54) ALLOCATING SPACE IN MESSAGE QUEUE FOR HETEROGENEOUS MESSAGES

(75) Inventors: Neeraj K. Gopalakrishna, Bangalore (IN); Sanjay M. Kesavan, Bangalore (IN); Lohitashwa Thyagaraj, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 12/827,112

(22) Filed: Jun. 30, 2010

(65) Prior Publication Data

US 2012/0005688 A1 Jan. 5, 2012

(51) Int. Cl.
*G06F 9/44* (2006.01)

(52) U.S. Cl.
USPC .......................................................... 719/314

(58) Field of Classification Search
USPC ......................................... 719/310, 313, 314
See application file for complete search history.

(56) References Cited

U.S. PATENT DOCUMENTS

| 5,717,745 | A | | 2/1998 | Vijay et al. | |
|---|---|---|---|---|---|
| 5,797,005 | A | * | 8/1998 | Bahls et al. | 719/314 |
| 5,887,168 | A | * | 3/1999 | Bahls et al. | 719/314 |
| 5,956,340 | A | | 9/1999 | Afek et al. | |
| 6,006,284 | A | * | 12/1999 | Cockroft | 710/14 |
| 6,279,041 | B1 | * | 8/2001 | Baber et al. | 709/232 |
| 6,546,428 | B2 | * | 4/2003 | Baber et al. | 709/232 |
| 7,203,706 | B2 | * | 4/2007 | Jain et al. | 1/1 |
| 7,408,875 | B2 | | 8/2008 | Garmire et al. | |
| 7,779,418 | B2 | * | 8/2010 | Surlaker et al. | 719/314 |
| 7,818,386 | B2 | * | 10/2010 | Surlaker et al. | 709/207 |
| 7,937,433 | B1 | * | 5/2011 | Kumar | 709/203 |
| 2003/0135547 | A1 | | 7/2003 | Kent et al. | |
| 2004/0024771 | A1 | * | 2/2004 | Jain et al. | 707/100 |
| 2004/0034640 | A1 | * | 2/2004 | Jain et al. | 707/10 |
| 2007/0299931 | A1 | | 12/2007 | Furphy et al. | |
| 2008/0028116 | A1 | | 1/2008 | Gregg et al. | |
| 2008/0040396 | A1 | | 2/2008 | Wallis et al. | |
| 2008/0163249 | A1 | | 7/2008 | Garza et al. | |

FOREIGN PATENT DOCUMENTS

WO 2009/002325 A1 12/2008

OTHER PUBLICATIONS

Marshall, Dave, "IPC:Message Queues:<sys/msg.h>", Jan. 5, 1999, printed from <http://www.cs.cf.ac.uk/Dave/C/node25.html> on Jul. 4, 2010, 15 pages.

* cited by examiner

Primary Examiner — Van Nguyen
(74) Attorney, Agent, or Firm — Marcia L. Doubet

(57) ABSTRACT

Allocating space for storing heterogeneous messages in a message queue according to message classification. The classification may comprise message type, application type, network type, and so forth. Messages of multiple classification values may be queued in a single queue, referred to as a primary queue. When the allocated portion of the primary queue is reached for a particular message classification, then subsequent messages having that classification are sent to a secondary queue for queueing. The secondary queue also allocates space according to message classification. When space for a particular message classification becomes available in the primary queue, one or more messages having that classification may be moved from the secondary queue to the primary queue.

14 Claims, 10 Drawing Sheets

FIG. 1

| Message Type | Percentage of Messages |
|---|---|
| Type_A | 50 |
| Type_B | 40 |
| Type_C | 10 |

ALLOCATING SPACE IN MESSAGE QUEUE FOR HETEROGENEOUS MESSAGES

BACKGROUND

The present invention relates to computing environments, and deals more particularly with allocating space for storing heterogeneous messages in a message queue according to message classification such as message type.

Currently-known messaging engines determine the total number of messages which can be stored based on a specified "queue depth" parameter value. This queue depth value is typically a static value that counts the number of stored messages, and messaging engines using this approach ensure that the number of stored messages does not exceed the queue depth value. In another known approach, the static value specifies the maximum amount of space the queued messages can occupy. In one known alternative, instead of using a static value, the queue depth value is dynamically modifiable using scripts or triggers. For example, executable code may be invoked from a script, or responsive to an event, to change the queue depth value at run time.

BRIEF SUMMARY

The present invention is directed to queuing messages in allocated space of a message queue in a computing system. In one aspect, this comprises: determining a classification of a message to be queued in the message queue; determining an amount of the space allocated to queuing messages having the determined classification; determining an amount of the space in use for already-queued messages having the determined classification; and if the determined amount of the space in use does not exceed the determined amount of the space allocated, then queuing the message in the message queue and updating the amount of the space in use, and otherwise, sending the message for queuing temporarily in a secondary queue.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

FIG. 1 depicts a sample data structure which defines message classifications for messages that may be held in a message queue;

DETAILED DESCRIPTION

Figure 2:
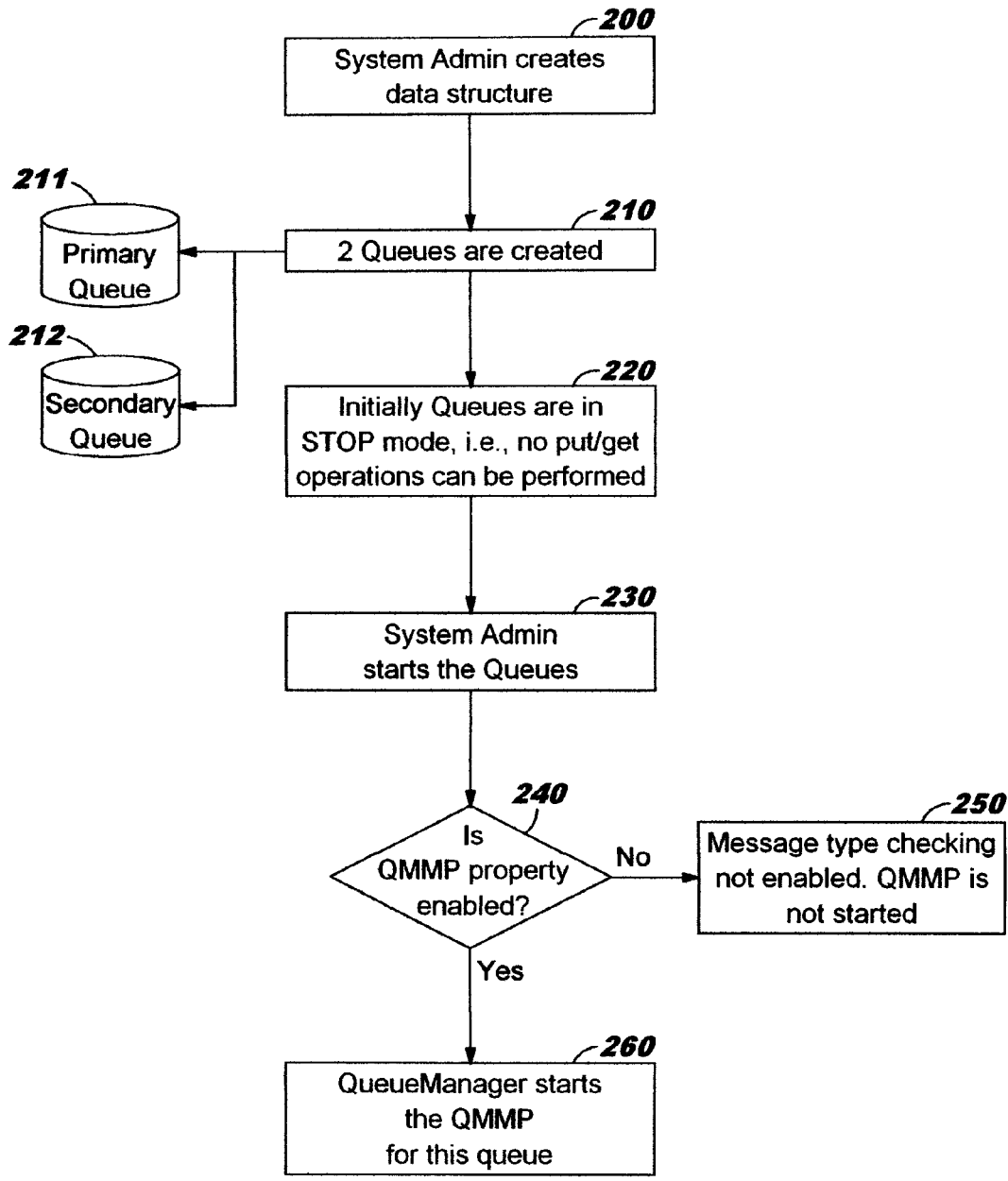
FIGS. 2-8 provide flowcharts depicting logic which may be used when implementing an embodiment of the present invention.

An embodiment of the present invention allocates space for heterogeneous messages to be stored in a message queue, based on classifying the messages. By way of illustration but not of limitation, examples presented herein are primarily directed to scenarios where the classification is based on a message type. Notably, the message type is not required to be in a specific "message type" field. Instead, the message type may be determined from any part of the message data or a specific message selector string or any property in the message. As one alternative to classifying messages by message type, the messages may be classified according to the application which sent the message for queuing. As another alternative, messages may be classified according to the network type over which those messages are sent to the messaging engine for queuing or, similarly, the network protocol with which the messages are delivered to the messaging engine. As still another alternative, messages may be classified according to the target recipient (which may be expressed as a particular user, or as a particular application, and so forth). In the general case, information used in the classification of a message may be specified in the message explicitly, or it may be determined from characteristics of the message—for example, by programmatically inspecting one or more strings and/or properties of the message.

Disadvantages of using known techniques that set a queue depth to a fixed number of messages or to a fixed amount of storage space will now be discussed.

Suppose a messaging engine uses a fixed queue depth value of 10,000 messages. Some applications may send relatively short messages for queuing, while other applications send relatively long messages. Simply counting the total number of messages may lead to less-than-optimal queuing. For example, if one application sends messages which are 50 Megabytes in length, and for some reason messages are not being dequeued quickly enough, the system may run out of storage space even before the queue depth limit is reached.

In another scenario, suppose that different applications connect to a message queue using different network protocols in order to send messages using different types of networks. This may happen, for example, in a geographically dispersed environment where remote outlets send messages to a central messaging hub, and the remote outlets use different network infrastructures because of differences in their physical locations, revenues, and/or network cost factors. Because of the physical characteristics of the various networks, some messages will take longer to transmit than others. The throughput of messages sent to the queue therefore depends on the underlying network infrastructures. For example, an application using dial-up services for connecting to a queue manager will take more time to send messages to the queue manager as compared to an application that uses a faster dedicated leased-line network. The leased-line outlet might be able to send 100 messages per minute for queuing, for example, while the dial-up outlet can send only 20 messages per minute, and an outlet using broadband might be able to send 50 messages per minute. Because of the differences in delivery time to the queue manager, outlets which send their messages using slower networks might not receive a fair share of storage space of the message queue. This approach also fails to consider the priority of the messages.

An embodiment of the present invention allows a messaging engine to intelligently and flexibly merge heterogeneous messages in a message queue according to predetermined message classifications. This classification approach ensures that space is dedicated, or reserved, in the message queue for the various classification values. In an environment where applications are sending high-priority and lower-priority messages to the same message queue, for example, an embodiment of the present invention can be used to prevent the lower-priority messages from occupying a disproportionate share of the queue to the detriment of the high-priority messages and, at the same time, can be used to prevent the high-priority messages from excluding the lower-priority messages from the message queue.

According to techniques disclosed herein, when messages are classified by message type, a percentage of message queue space to be allocated to each message type is defined. In one approach, a systems administrator creates a data structure which stores a set of tuples, where each tuple specifies a message type and the corresponding percentage of queue space allocated for that message type.

Suppose, for example, that applications in a banking environment are sending credit transaction messages as well as credit reversal transaction messages. The credit transactions are profitable for the bank, whereas the credit reversal transactions are not. Using an embodiment of the present invention, the bank might choose to allocate significantly more queue space to the profitable credit transactions than to the credit reversal transactions. The allocation of space can be defined, however, so that space in the queue is effectively "reserved" for storing at least some number of credit reversal transactions.

When messages are classified according to characteristics other than message type, the data structure (which is referred to herein as a set of tuples created by a systems administrator, by way of illustration but not of limitation) stores tuples which specify the pertinent classification values and the associated percentage of message queue space to be allocated for that value. For example, in the message hub scenario discussed earlier where remote outlets send messages at varying network speeds, a system administrator can configure the messaging engine to allocate a certain percentage of the queue space according to the type of network over which the messages are received for queuing. The tuples might specify that outlets using broadband transmission can use 30 percent of the queue space, while outlets using dial-up can use 20 percent of the queue space and outputs using leased lines can use the remaining 50 percent of the queue space. This approach to controlling the queue depth ensures that, at any given point of time, the outlets with lower speed transmission will have space reserved for them in the message queue, even though other outlets might send messages to the messaging engine more quickly. In turn, this allows the lower-speed outlets a better chance of having their messages delivered from the messaging engine because these outlets are less likely to encounter a "queue full" situation, as contrasted to queuing with known techniques. when sending their messages to the messaging engine.

Allocating space for messages based on a classification, as disclosed herein, will now be described in more detail with references to FIGS. 1-8. While these figures and corresponding discussion refer primarily to classifying messages by message type, this is by way of illustration only. One of ordinary skill in the art will readily understand how to adapt the data structures and logic when messages are classified using information other than message type, once the techniques disclosed herein are known.

FIG. 1 depicts a sample data structure 100 which defines a number of message types for messages that may be held in a message queue, along with a sample percentage allocation for each message type. Column 110 depicts the sample message types, while column 120 depicts the sample percentage allocations. In this example, messages of type "Type_A" are limited to 50 percent of the available message queue space, while messages of type "Type_B" and "Type_C" are limited to 40 percent and 10 percent, respectively. It may be beneficial, in scenarios where a message classification is not readily determined for each potential message, to include a "default" classification which can be used, although this has not been illustrated in FIG. 1.

An embodiment of the present invention uses a primary queue as well as a secondary queue. The secondary queue preferably has properties similar to the primary queue (although the secondary queue may be smaller in size than the primary queue), and serves as a type of overflow storage for the primary queue. Use of the primary and secondary queues is discussed in more detail below. In one approach, more than one set of primary and secondary queues may be provided (for example, for load balancing), and each such set is preferably managed as disclosed herein.

Several processes which are preferably provided for message queue management will now be described.

A "Queue Message Monitoring Process", referred to hereinafter as "QMMP", is responsible for monitoring the incoming messages that arrive for queuing. Preferably, each primary queue has a dedicated QMMP, although in an environment having multiple primary queues, it is not strictly necessary that all queues use message classification at all times. Accordingly, the QMMP is preferably provided as a process which can be selectively activated. For example, a systems administrator might turn off the QMMP, in which case inbound messages will be queued without regard to message classification.

A "Queue Message Classification Process", referred to hereinafter as "QMCP", is responsible for querying the data structure that defines the message classifications for messages that may be queued. This process is triggered by the queue manager when, for example, there is a request from an application to find out the defined classification values. When messages are classified according to message type, this QMCP may alternatively be referred to as a "Queue Message Type Process", or "QMTP".

A "Message Monitoring Queue Process", referred to hereinafter as "MMQP", is preferably provided for each secondary queue. The MMQP is responsible for moving messages between the primary queue and its corresponding secondary queue. This message movement is preferably performed in a manner that is transparent to the applications using the messaging engine. The MMQP preferably maintains an up-to-date list of the classifications of the messages currently queued in the secondary queue, and when the primary queue has available space for one of those message classifications, messages with the corresponding classification are moved from the secondary queue into the primary queue. By providing this type of overflow capability for the primary queue, applications can send more messages of a particular classification for queuing without encountering a "queue full" situation. With reference to the sample message type classifications in FIG. 1, for example, messages of type "Type_A" will be queued in the secondary queue when the allocated 50 percent of the primary queue is full; when some of the "Type_A" messages from the primary queue are delivered and therefore dequeued, "Type_A" messages queued in the secondary queue can be transferred to the freed-up space in the primary queue.

FIG. 2 provides a flowchart depicting logic which may be used when implementing a process for creating and configuring queues for messages classified according to message type, as will now be discussed.

Block 200 represents the system administrator creating (or updating) a data structure of the type illustrated in FIG. 1. Note that by updating the message classifications and/or allocated percentages in this data structure, the messaging engine can be dynamically adapted to change the mix of heterogeneous messages stored in a particular messaging queue. Block 210 represents creating two message queues, depicted as primary queue 211 and secondary queue 212. Block 220 notes that, when the queues 211, 212 are initially created, they are in a "stopped" mode where PUT and GET operations cannot be performed to queue and dequeue messages, respectively. Accordingly, the queues are started (i.e., made operational) at Block 230. In one approach, a systems administrator performs this queue-starting task. Block 240 tests a QMMP property representing the selective enablement of the QMMP. If this property is not enabled, then as noted at Block 250, message queuing occurs using known techniques, where the messages are queued without checking message classifications as disclosed herein, and the QMMP is not started. If the QMMP property is enabled, on the other hand, then as noted at Block 260, the queue manager starts the QMMP for this queue, and message queuing will then be performed with regard to the defined message classifications as disclosed herein.

Figure 3:
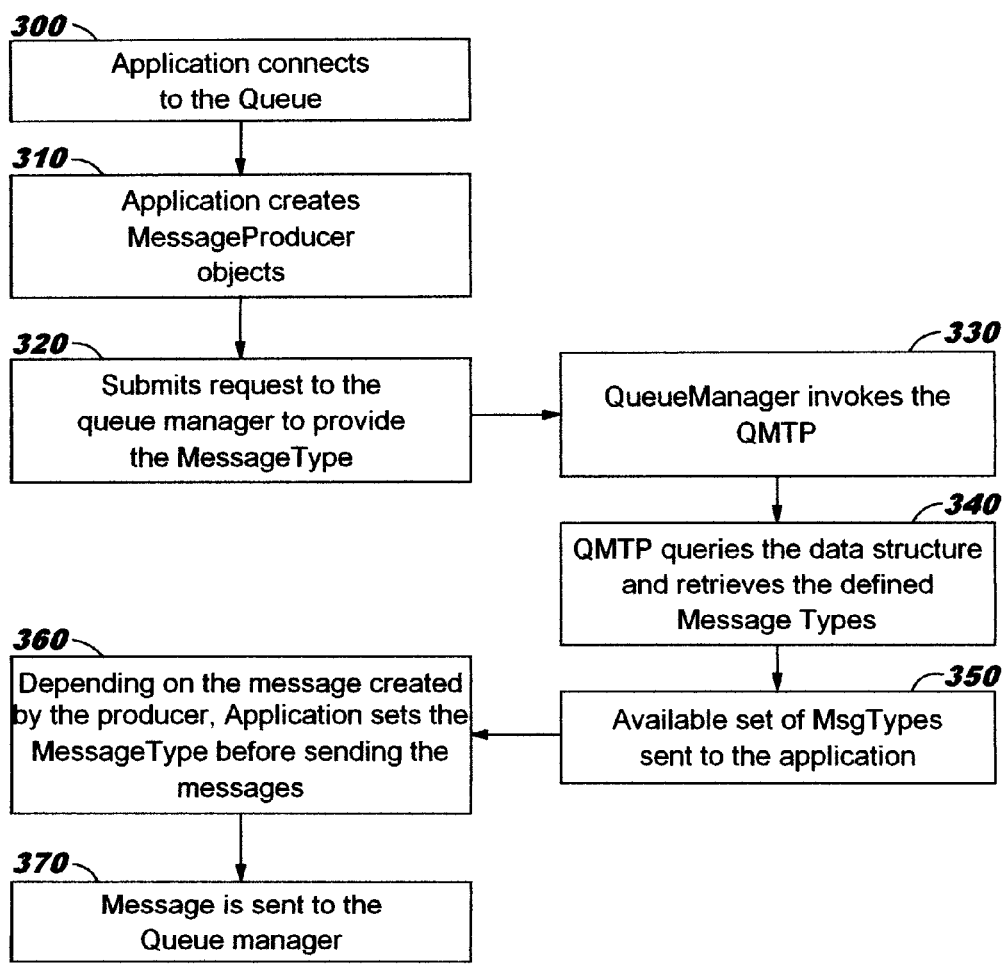

FIG. 3 provides a flowchart depicting logic which may be used when implementing a process for an application to query the currently-defined message classifications, using an example where messages are classified according to message type, so that the classification in messages created by that application may be set prior to sending messages to the messaging engine for queuing. Note that if the message classification is determined implicitly from characteristics inherent to the message, this processing may be omitted.

In Block 300, the application makes a connection to the primary queue to which it will send messages. The application then creates one or more message producer objects, according to the needs of the particular application, as shown at Block 310. At Block 320, the application submits a request to the queue manager, asking for the currently-defined message classifications, which in this example are message types. As shown at Block 330, the queue manager at the messaging engine receives this request and invokes the QMTP (or more generally, the QMCP). The QMTP queries a data structure where the defined message classification information is stored, one example of which is illustrated in FIG. 1, and retrieves the classification values stored therein (Block 340). Those classification values are then sent to the requesting application (Block 350). Depending on the messages created by the application's producer objects, the message type (or alternative message classification value) is set by the application (Block 360), after which the application sends the message to the queue manager of the messaging engine for queuing (Block 370).

Figure 4:
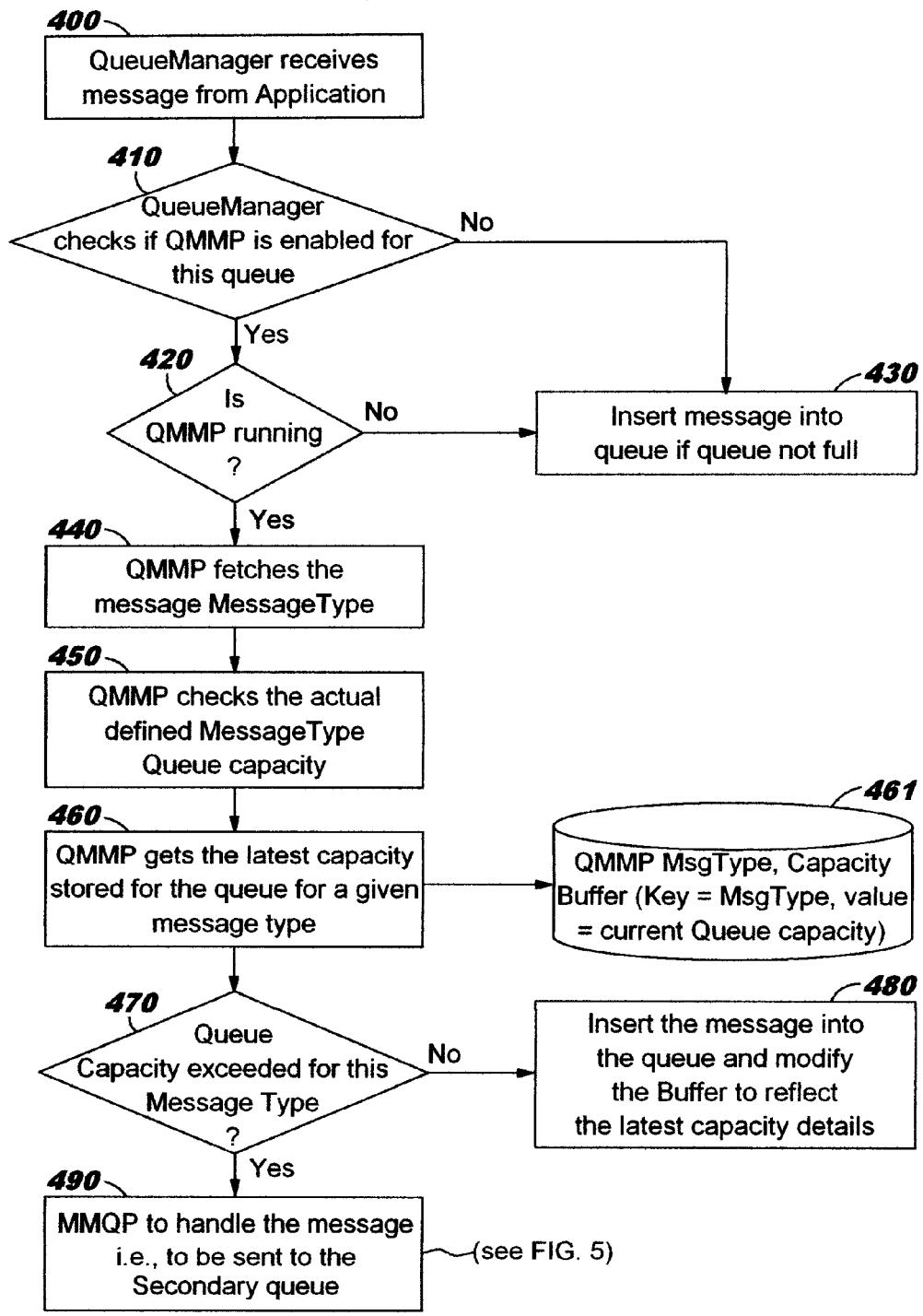

FIG. 4 provides a flowchart depicting logic which may be used when implementing a process for handling messages received at a messaging engine, using an example where messages are classified according to message type.

In Block 400, the queue manager at the messaging engine receives a message to be queued from an application. This message may contain a message type which was set by the application according to the processing of FIG. 3. Alternatively, the classification for this message may be determined in another way (such as by inspecting characteristics of the message, as discussed earlier). The queue manager then checks the QMMP property for this queue to determine whether message classification is enabled (Block 410). If the test at Block 410 has a positive result, processing continues at Block 420 which checks whether the QMMP for this queue is running If the test at Block 420 also has a positive result, processing continues at Block 440.

When either of Block 410 or 420 has a negative result, the message classification disclosed herein is not in use, and therefore Block 430 inserts the message into the message queue (if the queue is not already full) using known techniques where messages are queued without checking message classifications. The processing of FIG. 4 then ends.

When processing reaches Block 440, the QMMP fetches the message type (or other classification value, as appropriate) for this message, after which Block 450 uses this value to determine the defined capacity of the primary queue for storing messages of this type. The QMMP for each primary queue preferably maintains a data structure which records, for each defined message type (or other classification value), the defined capacity of the primary queue for that message type. A sample format for such a data structure has been discussed above with respect to FIG. 1. As an example, suppose that the message being processed is a "Type_A" message. The QMMP therefore determines that the maximum amount of primary queue storage allocated to messages of this type is 50 percent, as illustrated in column 120 of row 140 in FIG. 1. It should be noted that the allocation information may be stored as a percentage of total queue space, as allocated capacity (in megabytes, kilobytes, and so forth), or as a count that represents the total of number of messages which may be stored.

The QMMP for each primary queue also preferably maintains a buffer (or other data structure) that stores, for each defined message type (or other classification value, as appropriate) the current capacity of the primary queue. Block 460 gets the current capacity information from this data structure. In one approach, the data structure may be provided as a hash table, as noted at reference number 461 of FIG. 4, where the key for accessing the hash table is the type/classification value of the message being processed by FIG. 4 and the hash table value associated with this key is the current primary queue capacity. This queue capacity may be expressed in terms of how much of the allocation is already in use, or how much of the allocation remains unused.

Block 470 tests whether the primary queue capacity for the message type (or other classification, as appropriate) of the message being processed by FIG. 4 has been exceeded. If this test has a negative result, indicating that space remains in the primary queue for storing messages of this type/classification, then Block 480 inserts the message into the primary queue and modifies the value stored in the hash table (or other data structure) to reflect the resulting capacity information. On the other hand, when the test at Block 470 has a positive result, then the primary queue cannot currently store any more messages of this message type/classification, and Block 490 therefore informs the MMQP to handle this message. This will comprise attempting to insert the message into the secondary queue that corresponds to the already-full primary queue, as will be discussed in detail with regard to FIG. 5.

Figure 5:
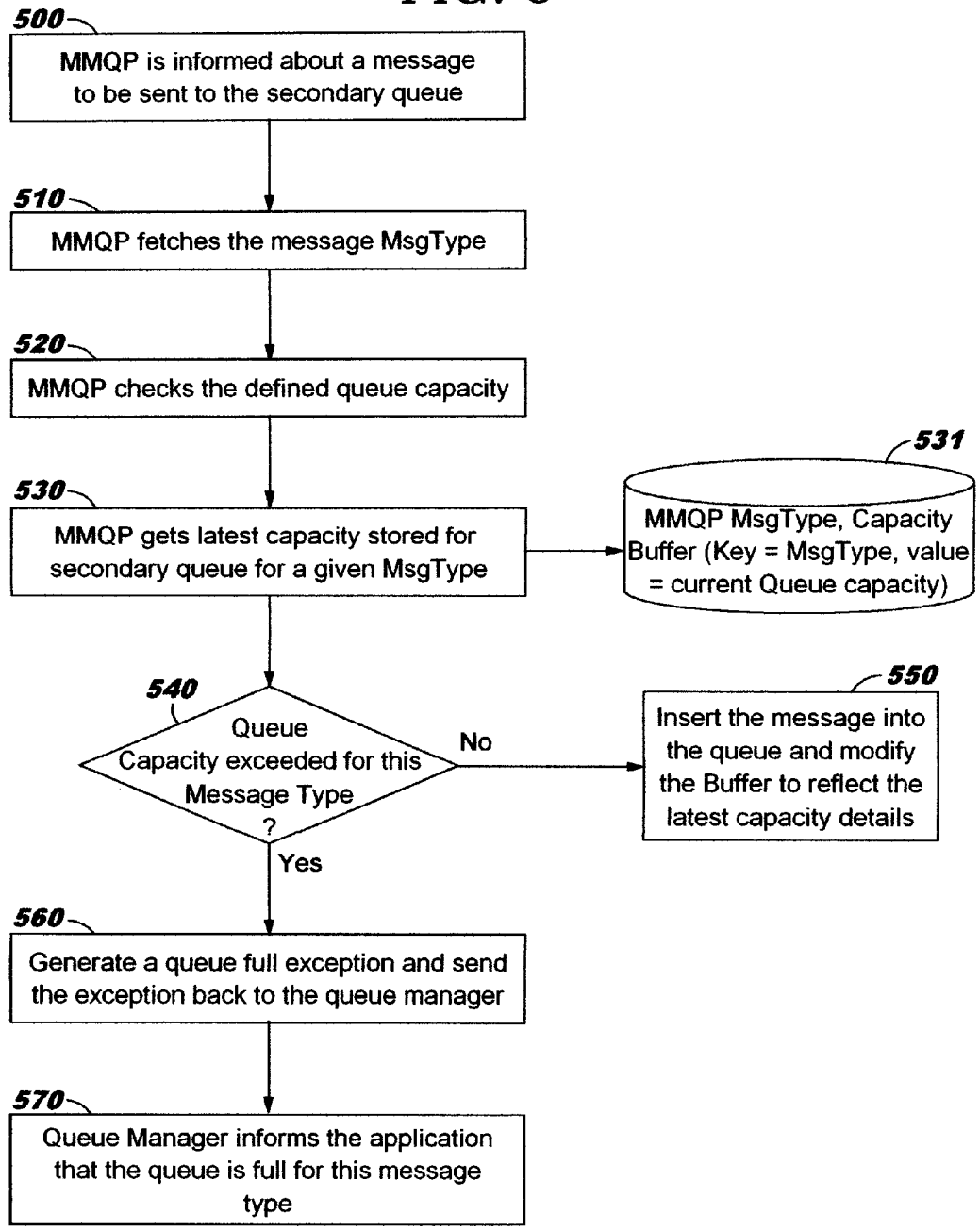

FIG. 5 provides a flowchart depicting logic which may be used when implementing a process for queuing messages temporarily in a secondary queue, upon invocation from Block 490 of FIG. 4. FIG. 5 is discussed with reference to an example where messages are classified according to message type.

At Block 500, the MMQP for the message queue is informed that a message is to be queued in the secondary queue. At Block 510, the MMQP fetches the message type for this message (or other classification value, as appropriate), after which Block 520 uses this value to determine the defined capacity of the secondary queue for storing messages of this type. When allocation information is expressed as a percentage value, the allocation information for the secondary queue is preferably identical to the allocation information for the primary queue to which this secondary queue corresponds. Therefore, in one approach, the MMQP for the secondary queue consults the data structure that records the defined capacity values for the corresponding primary queue (for example, a data structure of the type which has been discussed above with respect to FIG. 1). In an alternative approach, the MMQP for each secondary queue maintains a separate data structure which records, for each defined message type (or other classification value), the defined capacity of the secondary queue for that message type.

The MMQP preferably maintains a buffer (or other data structure) similar to that used by the QMMP to record current queue capacity. That is, the MMQP maintains a data structure that stores, for each defined message type (or other classification value, as appropriate) the current capacity of the secondary queue. Block 530 gets the current capacity information from this data structure. In one approach, the data structure may be provided as a hash table, as noted at reference number 531 of FIG. 5, where the key for accessing the hash table is the type/classification value of the message being processed by FIG. 5 and the hash table value associated with this key is the current secondary queue capacity. This queue capacity may be expressed in terms of how much of the allocation is already in use, or how much of the allocation remains unused.

Block 540 tests whether the secondary queue capacity for the message type (or other classification, as appropriate) of the message being processed by FIG. 5 has been exceeded. If this test has a negative result, indicating that space remains in the secondary queue for storing messages of this type/classification, then Block 550 inserts the message into the secondary queue and modifies the value stored in the hash table (or other data structure) to reflect the resulting capacity information. Note that messages queued in the secondary queue by Block 550 are queued there temporarily: according to an embodiment of the present invention, messages are moved from the secondary queue to the primary queue when space in the primary queue becomes available for that particular message classification (as discussed below with reference to FIG. 6). On the other hand, when the test at Block 540 has a positive result, then the secondary queue cannot currently store any more messages of this message type/classification, and Block 560 therefore generates a "queue full" exception (or other type of error or warning indication) and sends this exception (or other error/warning) to the queue manager, after which the queue manager informs the application which sent this message that the queue is already full for messages of this type/classification (Block 570).

Figure 6:
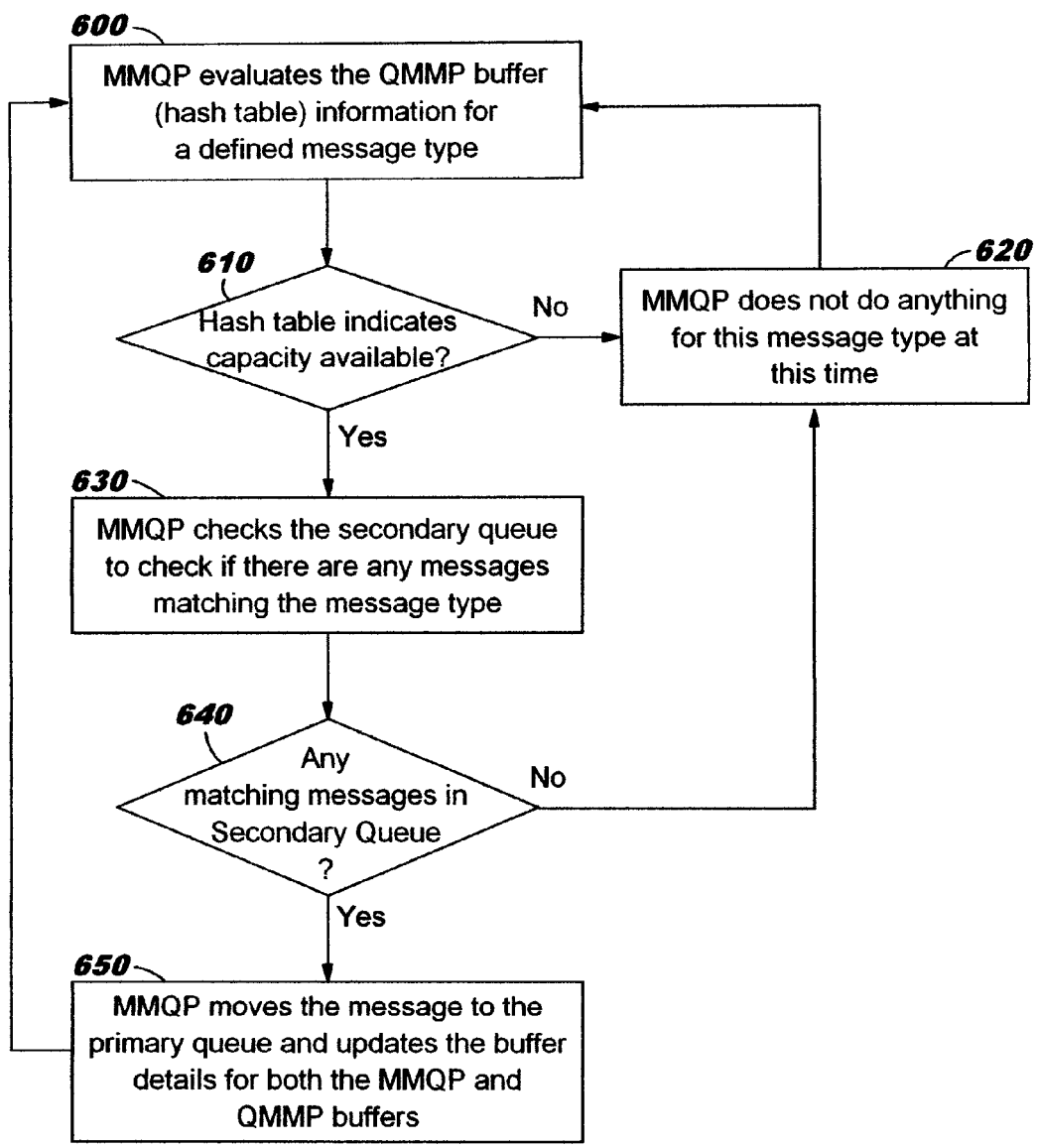

FIG. 6 provides a flowchart depicting logic which may be used when implementing a monitoring process whereby the MMQP constantly monitors the QMMP's data structure to determine whether space has become available in the primary queue for queuing messages of any defined message type (or other classification, as appropriate), and if so, attempts to fill the available space with messages from the secondary queue.

In one approach, the processing in FIG. 6 iterates over all of the defined message types (or other classification values, as appropriate) for this queue. In another approach, the processing iterates over the message types of the messages currently stored in the secondary queue (which may be a subset of the total set of defined message types.) Details of selecting which message type to evaluate during the iteration are omitted from FIG. 6 for simplicity. In one approach, the iteration capability comprises using the processing of Blocks 600-650 to successively process each hash table entry from the QMMP buffer (which was discussed earlier with reference to 460, 461 of FIG. 4) until reaching the last hash table entry, and then beginning again at Block 600 with the first hash table entry. One of ordinary skill in the art can readily adapt FIG. 6 to include this iteration, in view of the techniques disclosed herein. Accordingly, as indicated in Block 600, the MMQP evaluates one of the entries from the QMMP's buffer (or other data structure), which is referred to in FIG. 6 as being implemented as a hash table.

Block 610 tests whether the current primary queue capacity, as indicated by the QMMP hash table value for a particular one of the hash table keys, indicates that capacity is available for storing messages of this type (or other classification, as appropriate) in the primary queue. If not, then the MMQP does not do further processing for this message type at the present time, as indicated at Block 620, and control therefore returns to Block 600 to evaluate the hash table entry for a different message type.

When the test at Block 610 has a positive result, then space is available in the primary queue for storing messages of this message type. Processing therefore continues at Block 630, where the MMQP checks the secondary queue to see if any messages of this message type are currently queued in the secondary queue. As noted earlier, the MMQP preferably maintains an up-to-date list of the classifications of the messages currently stored in the secondary queue, and Block 630 can therefore consult this list. In an alternative approach, the processing of Block 630 may comprise obtaining the value of the current entry from the MMQP's hash table to determine if the full amount of allocated storage space for this message type remains available in the secondary queue (and if so, this indicates that there are currently no messages of this type in the secondary queue). Accordingly, Block 640 tests whether there are any matching queued messages in the secondary queue (i.e., queued messages that match the message type/classification of interest). If not, then the MMQP does not do further processing for this message type at the present time, as indicated at Block 620, and control therefore returns to Block 600 to evaluate the hash table entry for a different message type/classification.

When the test at Block 640 has a positive result, then there are queued messages in the secondary queue for this message type (and it has already been determined at Block 610 that the primary queue has space available for messages of this type). Accordingly, Block 650 moves one or more of these messages from the secondary queue to the primary queue. In one approach, the processing of Block 650 moves a single message of the current message type, and the next iteration of the processing of FIG. 6 evaluates the next-successive message type. In another approach, Block 650 moves messages of the current message type from the secondary queue to the primary queue until determining that the defined allocation for messages of this message type within the primary queue is full. In either approach, Block 650 also updates the value stored in the current entry from the hash table (that is, the entry retrieved using the currently-processed message type as a hash table key) of both the MMQP and the QMMP to reflect the resulting capacity information of the secondary and primary queues, respectively. Control then returns to Block 600 to begin evaluating the message type/classification from the next hash table entry.

Figure 7:
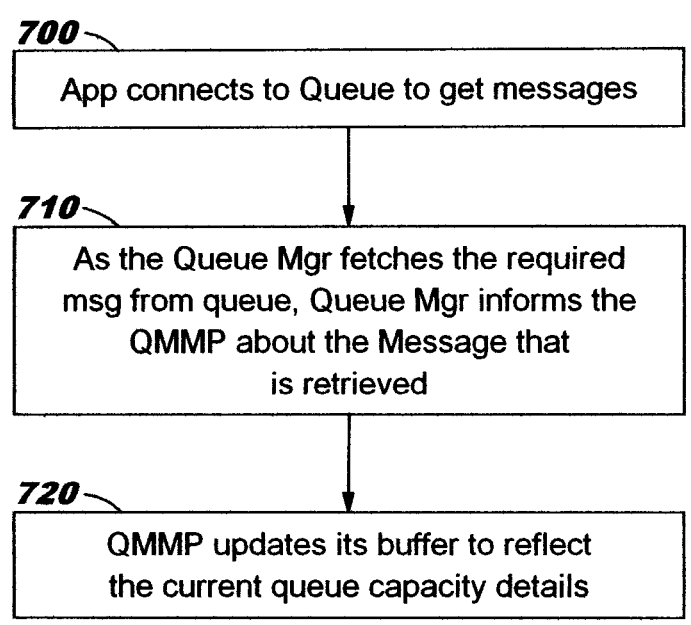

FIG. 7 provides a flowchart depicting logic which may be used when implementing a process for dequeueing messages from a primary queue (responsive, for example, to an application pulling messages therefrom).

At Block 700, an application connecting to a queue invokes a GET operation to retrieve a queued message from the primary queue. As the queue manager fetches the required message from the primary queue, it also informs the QMMP that a message is now dequeued (Block 710). The QMMP then updates its data structure, which was discussed above as a hash table (see the discussion of 461 of FIG. 4), to reflect the now-current primary queue capacity for messages of this type/classification (Block 720). The processing of FIG. 7 for the dequeued message then ends.

Figure 8:
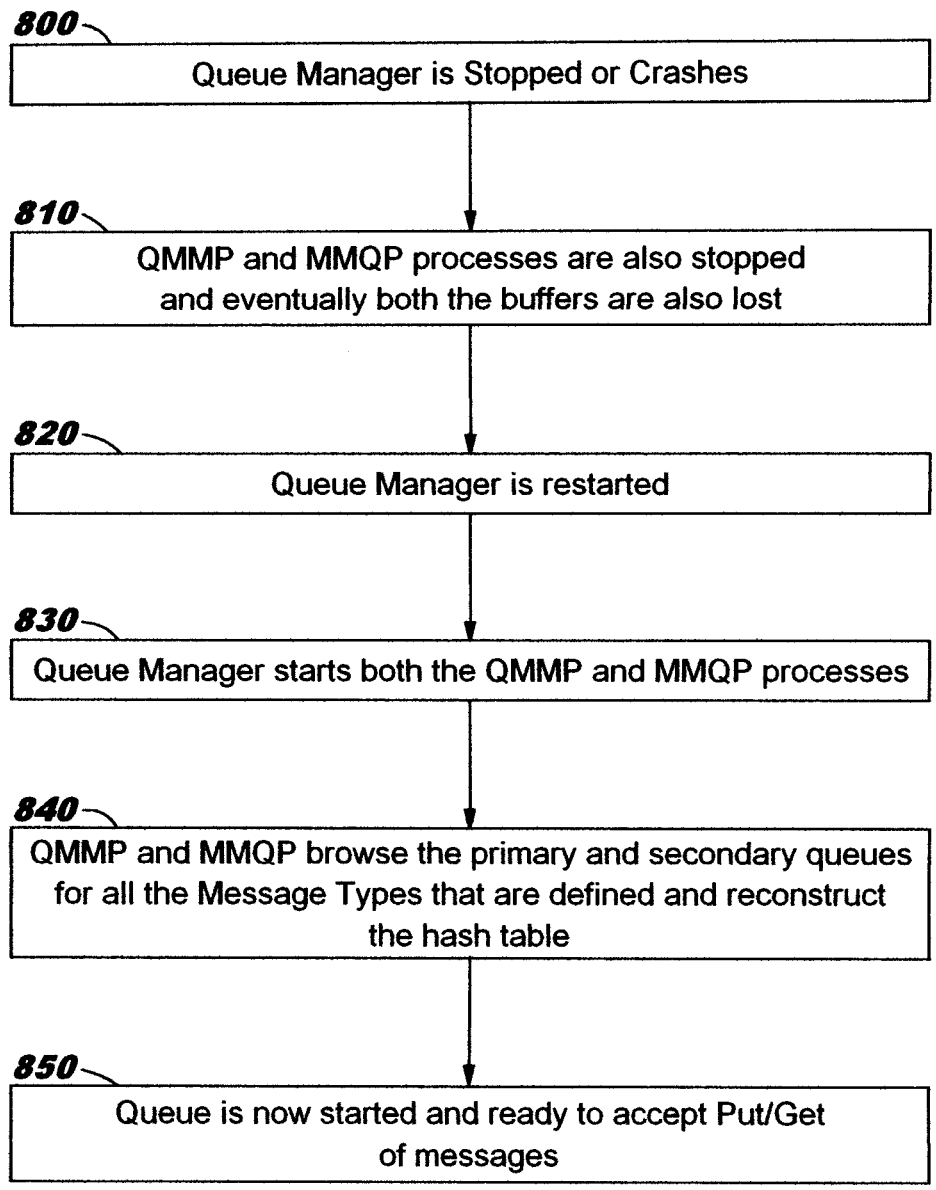

FIG. 8 provides a flowchart depicting logic which may be used when implementing a process that handles stopping of the queue manager or a crash of the queue manager. Again, this processing is discussed with reference to an example where messages are classified according to message type.

Block 800 detects that the queue manager has stopped or crashed. The QMMP and MMQP for each managed queue are then stopped (Block 810), and the buffers used by those processes to record current queue capacity will eventually be lost. (For example, the storage used to hold the buffers may be reclaimed during garbage collection.) The queue manager is restarted (Block 820), and then in turn, it restarts both the QMMP and MMQP (Block 830). In Block 840, the QMMP and MMQP perform reconstruction for the lost buffers, which preferably comprises the QMMP and MMQP evaluating the primary queue and secondary queue, respectively, for all defined message types to determine the currently-available queue capacity for each message type and then recreating the hash table entries to reflect this information. At Block 850, the primary and secondary queues are started (i.e., made operational), and are then ready to accept PUT and GET operations to queue and dequeue messages, respectively.

As has been demonstrated, an embodiment of the present invention enables flexibly merging heterogeneous messages in a message queue according to predetermined message classifications. Varying message sizes can be accommodated, in terms of filling a queue to capacity of each message classification, rather than simply counting messages as in known approaches.

Figure 9:
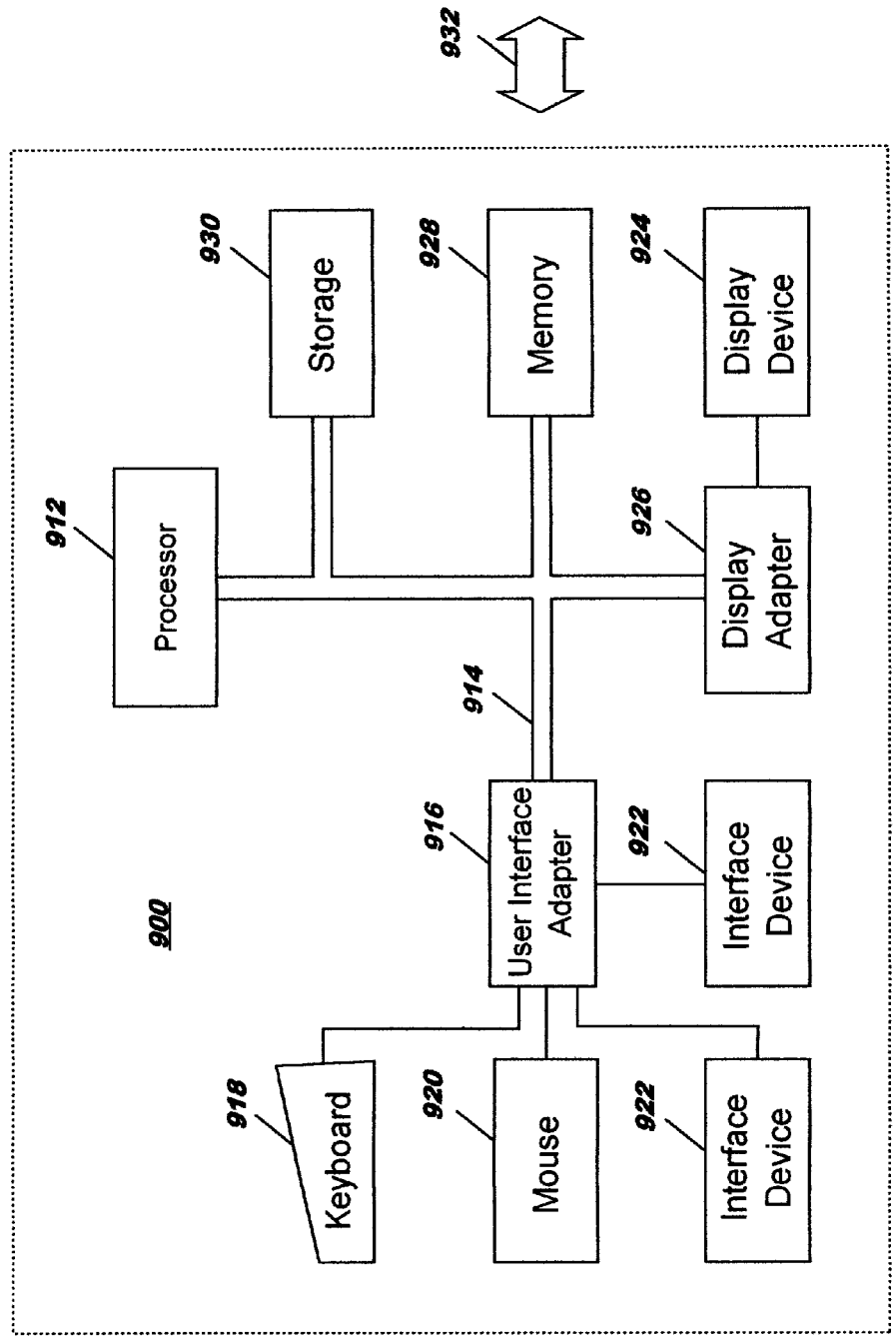
FIG. 9 depicts a data processing system suitable for storing and/or executing program code.

Referring now to FIG. 9, a data processing system 900 suitable for storing and/or executing program code includes at least one processor 912 coupled directly or indirectly to memory elements through a system bus 914. The memory elements can include local memory 928 employed during actual execution of the program code, bulk storage 930, and cache memories (not shown) which provide temporary storage of at least some program code in order to reduce the number of times code must be retrieved from bulk storage during execution.

Input/output ("I/O") devices (including but not limited to keyboards 918, displays 924, pointing devices 920, other interface devices 922, etc.) can be coupled to the system either directly or through intervening I/O controllers or adapters (916, 926).

Network adapters may also be coupled to the system to enable the data processing system to become coupled to other data processing systems or remote printers or storage devices through intervening private or public networks (as shown generally at 932). Modems, cable modem attachments, wireless adapters, and Ethernet cards are just a few of the currently-available types of network adapters.

Figure 10:
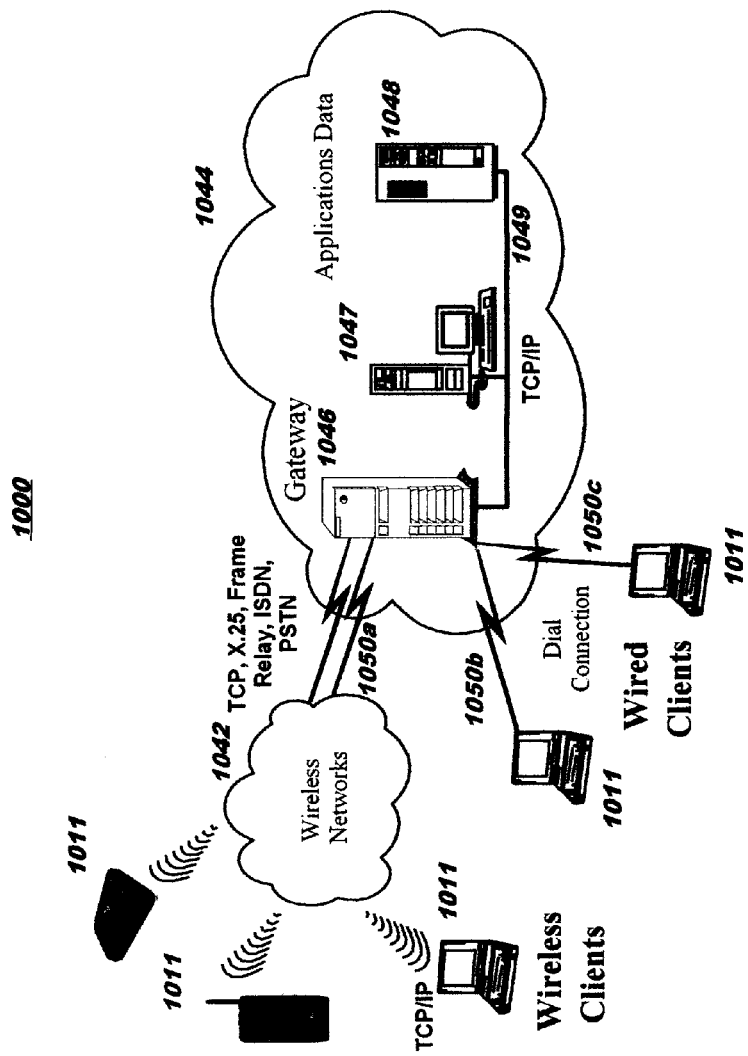
FIG. 10 depicts a representative networking environment in which one or more embodiments of the present invention may be used.

FIG. 10 illustrates a data processing network environment 1000 in which the present invention may be practiced. The data processing network 1000 may include a plurality of individual networks, such as wireless network 1042 and wired network 1044. A plurality of wireless devices 1010 may communicate over wireless network 1042, and a plurality of wired devices, shown in the figure (by way of illustration) as workstations 1011, may communicate over network 1044. Additionally, as those skilled in the art will appreciate, one or more local area networks ("LANs") may be included (not shown), where a LAN may comprise a plurality of devices coupled to a host processor.

Still referring to FIG. 10, the networks 1042 and 1044 may also include mainframe computers or servers, such as a gateway computer 1046 or application server 1047 (which may access a data repository 1048). A gateway computer 1046 serves as a point of entry into each network, such as network 1044. The gateway 1046 may be preferably coupled to another network 1042 by means of a communications link 1050*a*. The gateway 1046 may also be directly coupled to one or more workstations 1011 using a communications link 1050*b*, 1050*c*, and/or may be indirectly coupled to such devices. The gateway computer 1046 may be implemented utilizing an Enterprise Systems Architecture/390® computer available from IBM. Depending on the application, a midrange computer, such as an iSeries®, System i™, and so forth may be employed. ("Enterprise Systems Architecture/390" and "iSeries" are registered trademarks of IBM in the United States, other countries, or both, and "System i" is a trademark of IBM.)

The gateway computer 1046 may also be coupled 1049 to a storage device (such as data repository 1048).

Those skilled in the art will appreciate that the gateway computer 1046 may be located a great geographic distance from the network 1042, and similarly, the workstations 1011 may be located some distance from the networks 1042 and 1044, respectively. For example, the network 1042 may be located in California, while the gateway 1046 may be located in Texas, and one or more of the workstations 1011 may be located in Florida. The workstations 1011 may connect to the wireless network 1042 using a networking protocol such as the Transmission Control Protocol/Internet Protocol ("TCP/IP") over a number of alternative connection media, such as cellular phone, radio frequency networks, satellite networks, etc. The wireless network 1042 preferably connects to the gateway 1046 using a network connection 1050*a* such as TCP or User Datagram Protocol ("UDP") over IP, X.25, Frame Relay, Integrated Services Digital Network ("ISDN"), Public Switched Telephone Network ("PSTN"), etc. The workstations 1011 may connect directly to the gateway 1046 using dial connections 1050*b* or 1050*c*. Further, the wireless network 1042 and network 1044 may connect to one or more other networks (not shown), in an analogous manner to that depicted in FIG. 10.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A method of queueing messages in allocated space of a message queue in a computing system, comprising:
   determining a classification of a message to be queued in a message queue that queues messages for a plurality of classifications, further comprising:
      evaluating at least one characteristic of the message; and
      selecting, from a plurality of predetermined classifications, the classification that corresponds to the evaluated at least one characteristic;
   determining, from a total amount of space of the message queue, an amount of the space that is allocated to queueing messages having the determined classification;
   determining an amount of the allocated space that is in use for already-queued messages having the determined classification; and
   if the determined amount of the allocated space that is in use for the already-queued messages having the determined classification does not exceed the determined amount of the space that is allocated to queueing messages having the determined classification, then queueing the message in the message queue and updating the amount of the allocated space that is in use for the already-queued messages having the determined classification, and otherwise, sending the message for queueing temporarily in a secondary queue that is distinct from the message queue.

2. The method according to claim 1, wherein a determined amount of space of the secondary queue is also allocated to queueing messages having the determined classification.

3. The method according to claim 1, wherein the classification is a message type of the message to be queued.

4. The method according to claim 1, wherein the message to be queued is classified according to an application which generated the message.

5. The method according to claim 1, wherein the message to be queued is classified according to a network type of a network over which the message is sent to the messaging queue to be queued.

6. The method according to claim 1, wherein the message to be queued is classified according to a target recipient of the message.

7. The method according to claim 1, further comprising responding to receiving the message for queueing temporarily in the secondary queue by:
 determining, from a total amount of space of the secondary queue, an amount of space of the secondary queue which is allocated to queueing messages having the determined classification, the secondary queue queueing messages having a second plurality of classifications;
 determining an amount of the allocated space of the secondary queue which is in use for already-queued messages having the determined classification; and
 if the determined amount of the allocated space of the secondary queue which is in use for the already-queued messages having the determined classification does not exceed the determined amount of the space of the secondary queue which is allocated to queueing messages having the determined classification, then queueing the message in the secondary queue and updating the amount of the allocated space of the secondary queue which is in use for the already-queued messages having the determined classification.

8. The method according to claim 7, further comprising generating a warning that the message cannot be queued when the determined amount of the allocated space of the secondary queue which is in use for the already-queued messages having the determined classification exceeds or equals the determined amount of the allocated space of the secondary queue which is allocated for queueing messages having the determined classification.

9. The method according to claim 1, further comprising iteratively evaluating whether the message queue has unused space in the space allocated to queueing messages having any of the plurality of classifications and, if so, determining whether any messages having the any classification are queued in the secondary queue and, if so, moving at least one of the queued messages from the secondary queue to the message queue and updating the amount of the allocated space of the message queue which is in use for already-queued messages having the any classification and the amount of the allocated space of the secondary queue which is in use for already-queued messages having the any classification.

10. The method according to claim 1, further comprising iteratively evaluating, for each classification for which at least one message is queued in the secondary queue, whether the message queue has unused space in the space which is allocated to queueing messages having the each classification and, if so, moving at least one of the queued messages from the secondary queue to the message queue and updating the amount of the allocated space of the message queue which is in use for already-queued messages having the each classification and the amount of the allocated space of the secondary queue which is in use for already-queued messages having the each classification.

11. A system for queueing messages in allocated space of a message queue in a computing system, comprising:
 a computer comprising a processor; and
 instructions which are executable, using the processor, to implement functions comprising:
  determining a classification of a message to be queued in a message queue that queues messages for a plurality of classifications, further comprising:
   evaluating at least one characteristic of the message; and
   selecting, from a plurality of predetermined classifications, the classification that corresponds to the evaluated at least one characteristic;
  determining, from a total amount of space of the message queue, an amount of the space that is allocated to queueing messages having the determined classification;
  determining an amount of the allocated space that is in use for already-queued messages having the determined classification; and
  if the determined amount of the allocated space that is in use for the already-queued messages having the determined classification does not exceed the determined amount of the space that is allocated to queueing messages having the determined classification, then queueing the message in the message queue and updating the amount of the allocated space that is in use for the already-queued messages having the determined classification, and otherwise, sending the message for queueing temporarily in a secondary queue that is distinct from the message queue.

12. The system according to claim 11, wherein the functions further comprise responding to receiving the message for queueing temporarily in the secondary queue by:
 determining, from a total amount of space of the secondary queue, an amount of space of the secondary queue which is allocated to queueing messages having the determined classification, the secondary queue queueing messages having a second plurality of classifications;
 determining an amount of the allocated space of the secondary queue which is in use for already-queued messages having the determined classification; and
 if the determined amount of the allocated space of the secondary queue which is in use for the already-queued messages having the determined classification does not exceed the determined amount of the space of the secondary queue which is allocated to queueing messages having the determined classification, then queueing the message in the secondary queue and updating the amount of the allocated space of the secondary queue which is in use for the already-queued messages having the determined classification.

13. A computer program product for queueing messages in allocated space of a message queue in a computing system, the computer program product comprising:
 a non-transitory computer readable storage medium having computer readable program code embodied therein, the computer readable program code configured for:
  determining a classification of a message to be queued in a message queue that queues messages for a plurality of classifications, further comprising:
   evaluating at least one characteristic of the message; and
   selecting, from a plurality of predetermined classifications, the classification that corresponds to the evaluated at least one characteristic;

determining, from a total amount of space of the message queue, an amount of the space that is allocated to queueing messages having the determined classification;

determining an amount of the allocated space that is in use for already-queued messages having the determined classification; and if the determined amount of the allocated space that is in use for the already-queued messages having the determined classification does not exceed the determined amount of the space that is allocated to queueing messages having the determined classification, then queueing the message in the message queue and updating the amount of the allocated space that is in use for the already-queued messages having the determined classification, and otherwise, sending the message for queueing temporarily in a secondary queue that is distinct from the message queue.

14. The computer program product according to claim 13, wherein the computer readable program code is further configured for responding to receiving the message for queueing temporarily in the secondary queue by:

determining, from a total amount of space of the secondary queue, an amount of space of the secondary queue which is allocated to queueing messages having the determined classification, the secondary queue queueing messages having a second plurality of classifications;

determining an amount of the allocated space of the secondary queue which is in use for already-queued messages having the determined classification; and if the determined amount of the allocated space of the secondary queue which is in use for the already-queued messages having the determined classification does not exceed the determined amount of the space of the secondary queue which is allocated to queueing messages having the determined classification, then queueing the message in the secondary queue and updating the amount of the allocated space of the secondary queue which is in use for the already-queued messages having the determined classification.

\* \* \* \* \*